Aug. 10, 1937.   A. G. CARLSON   2,089,534
WEIGHING AND BAG FILLING MECHANISM
Filed Nov. 17, 1934   4 Sheets-Sheet 1
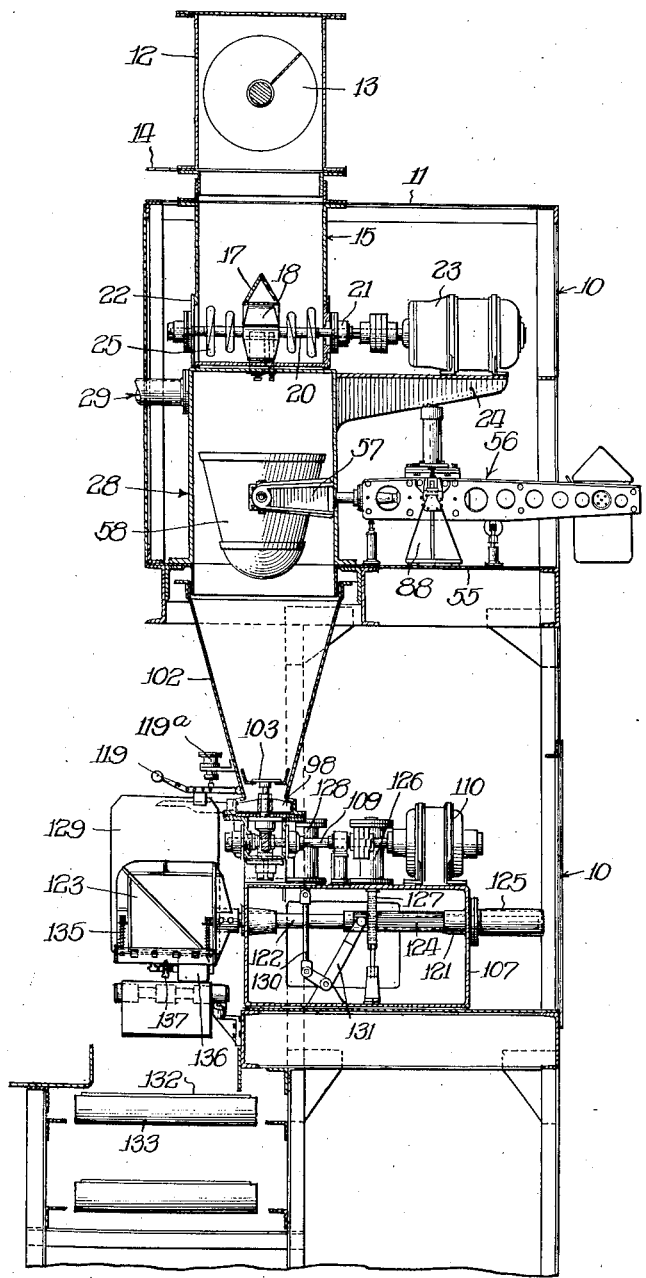
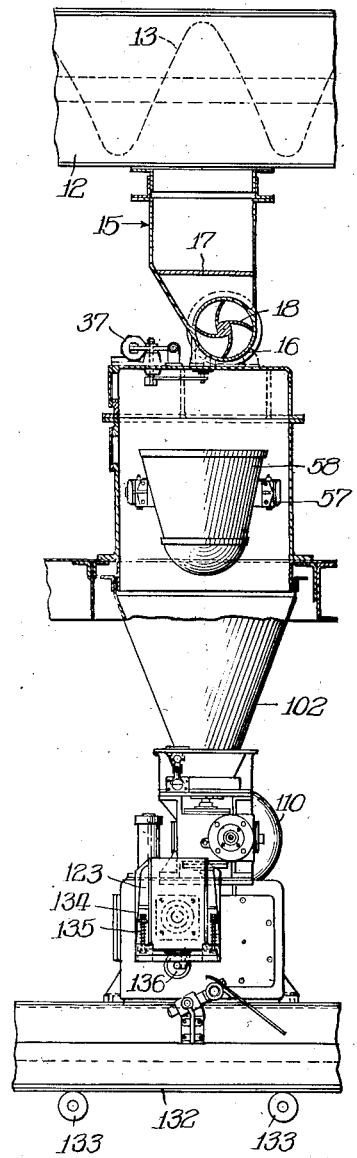
Inventor:
Adolph G. Carlson,
By Usina and Rauber
attys.

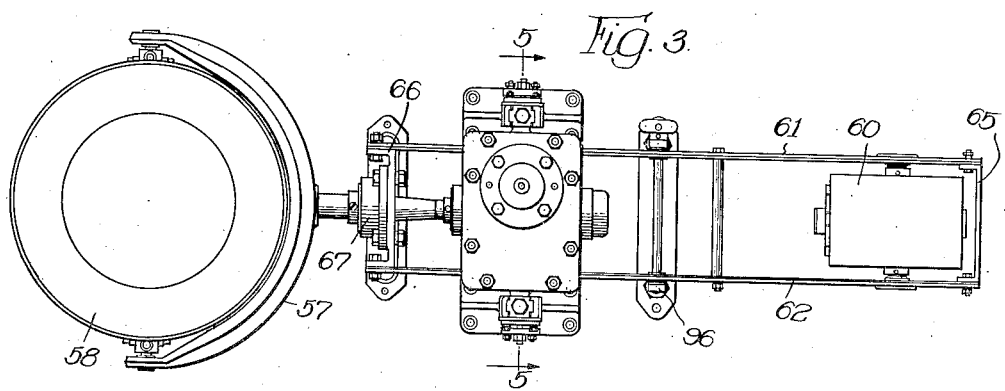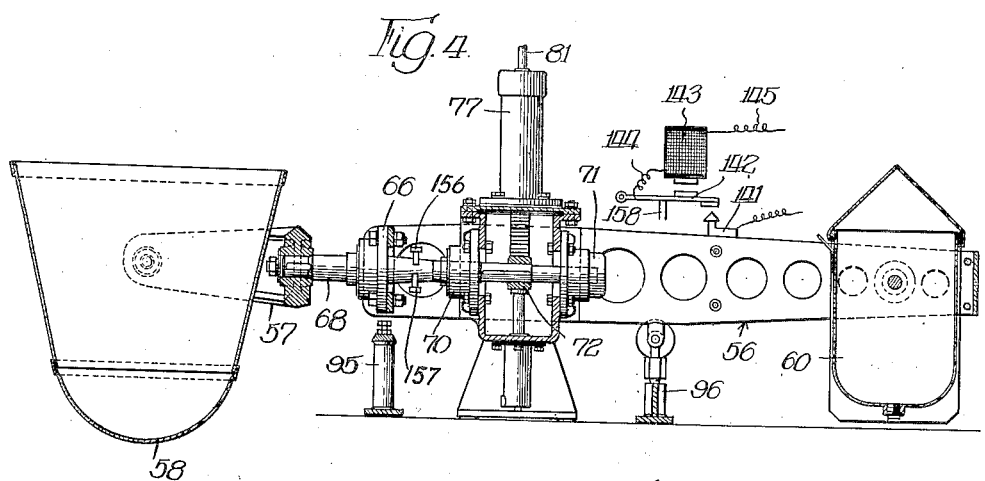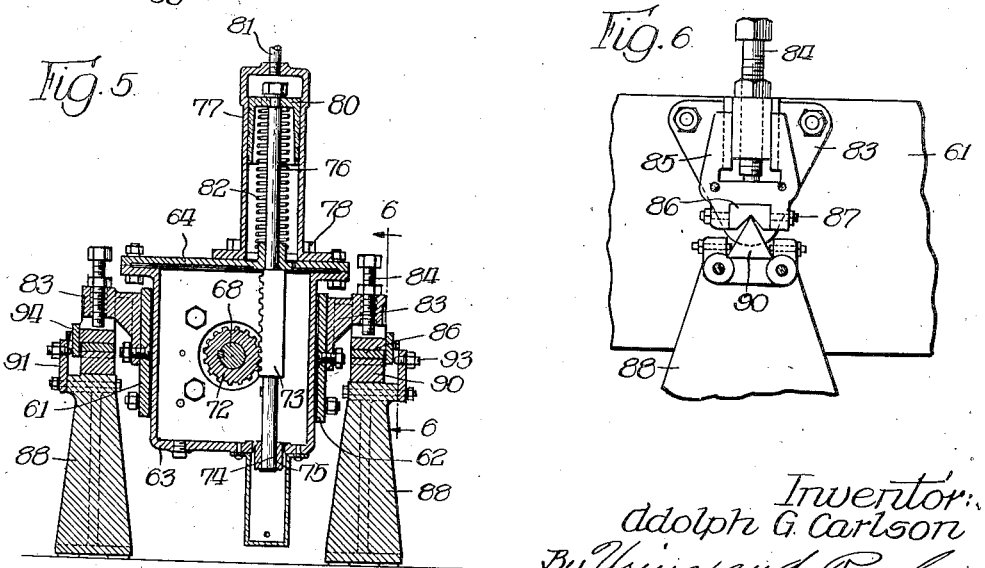

Aug. 10, 1937.  A. G. CARLSON  2,089,534
WEIGHING AND BAG FILLING MECHANISM
Filed Nov. 17, 1934  4 Sheets-Sheet 3
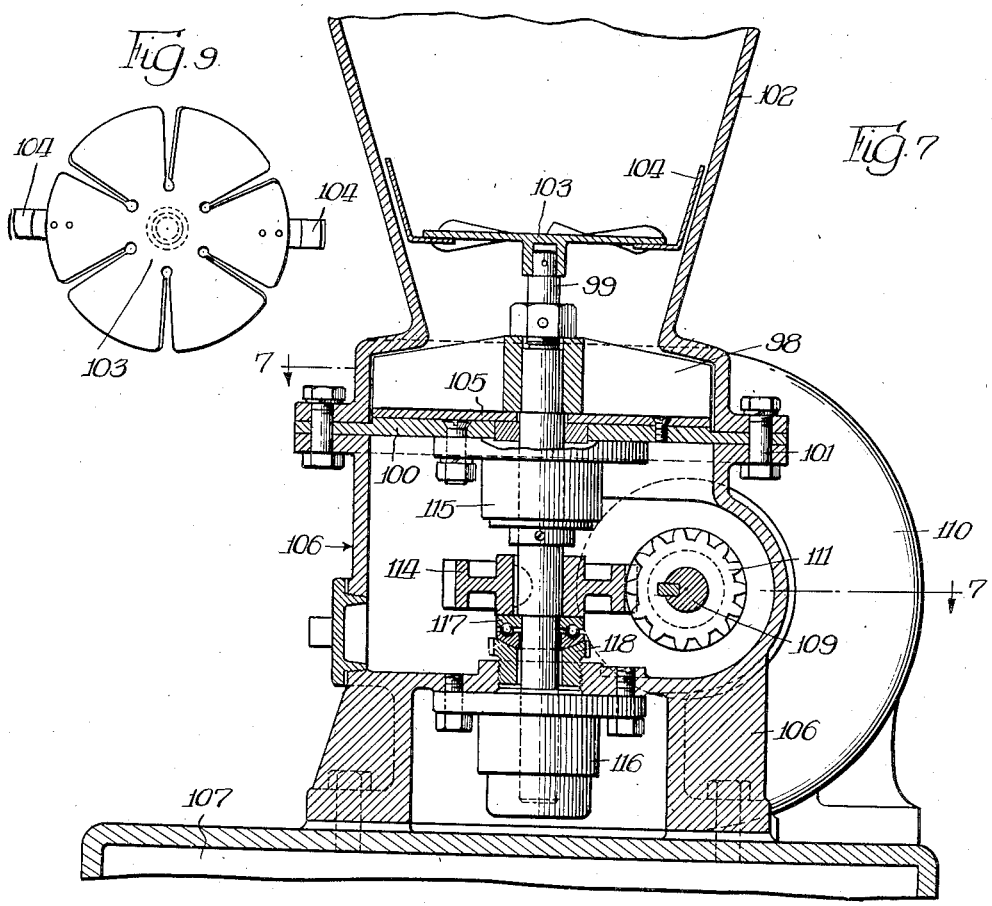
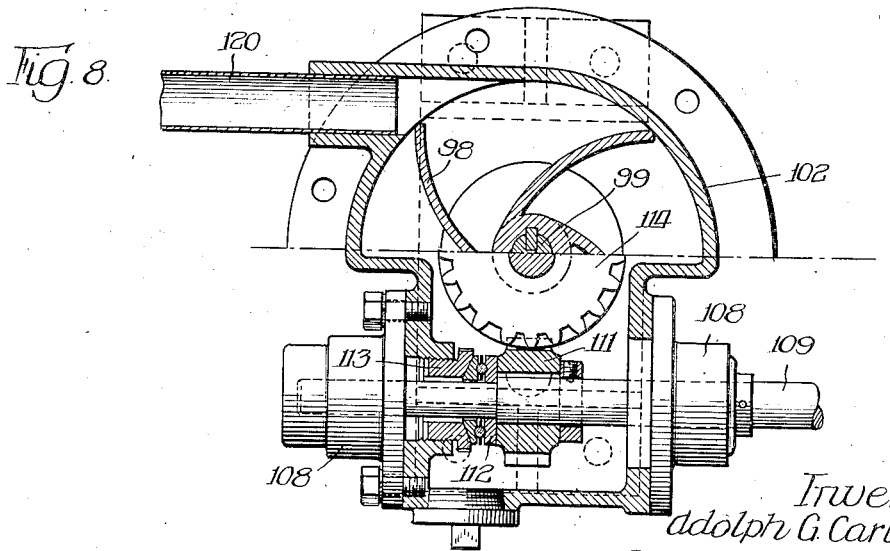
Inventor:
Adolph G. Carlson,
By Usina and Rauber
attys Aug. 10, 1937.  A. G. CARLSON  2,089,534
WEIGHING AND BAG FILLING MECHANISM
Filed Nov. 17, 1934  4 Sheets-Sheet 4

Inventor:
Adolph G. Carlson,
By Usina and Rumber
Attys.

Patented Aug. 10, 1937

2,089,534

UNITED STATES PATENT OFFICE 2,089,534

WEIGHING AND BAG FILLING MECHANISM

Adolph G. Carlson, Chicago, Ill.

Application November 17, 1934, Serial No. 753,495

1 Claim. (Cl. 249—20)

The invention relates to weighing machines and has particular reference to a machine for weighing cement and like materials.

An object of the invention is to provide combined weighing and bag filling apparatus that will first weigh a predetermined quantity of material and then discharge the said material to means having operation for efficiently filling a bag or other container without any loss of the material.

Another object of the invention is to provide improved weighing and bag filling mechanism which will materially improve the accuracy of weighing required for these operations. In the structure contemplated by the invention the weighing device weighs a predetermined quantity of material while a bag is being filled and which then holds the material so weighed until the filled bag is removed and replaced by an empty bag, when the operator by actuating a switch can rotate the weighing receptacle, causing the material to be delivered to the bag filling means, the weighing receptacle automatically returning to original position where another quantity is weighed and the cycle is repeated.

A further object is to provide a machine for performing the functions above described which will be simple in construction, economical to manufacture, and which will operate efficiently.

With these and various other objects in view the invention may consist of certain novel features of construction and operation, as will be more fully described and particularly pointed out in the specification, drawings and claim appended hereto.

In the drawings which illustrate an embodiment of the invention and wherein like reference characters are used to designate like parts—

Figure 1 is a vertical sectional view through a weighing and bag filling machine embodying the features of the present invention;

Figure 2 is a front elevational view, parts being shown in section of the machine of Figure 1, with the bag holder in vertical position;

Figure 3 is a detail plan view of the weighing mechanism;

Figure 4 is a vertical sectional view taken substantially along the longitudinal center of the weighing mechanism of Figure 3;

Figure 5 is a transverse vertical sectional view taken substantially along the line 5—5 of Figure 3;

Figure 6 is a detail sectional view showing the knife edge bearing for the balance beam;

Figure 7 is a detail vertical sectional view showing the bag filling means and part of the drive therefor;

Figure 8 is a horizontal sectional view taken substantially along line 7—7 of Figure 7;

Figure 9 is a detail plan view of the feeder plate;

Figure 10:
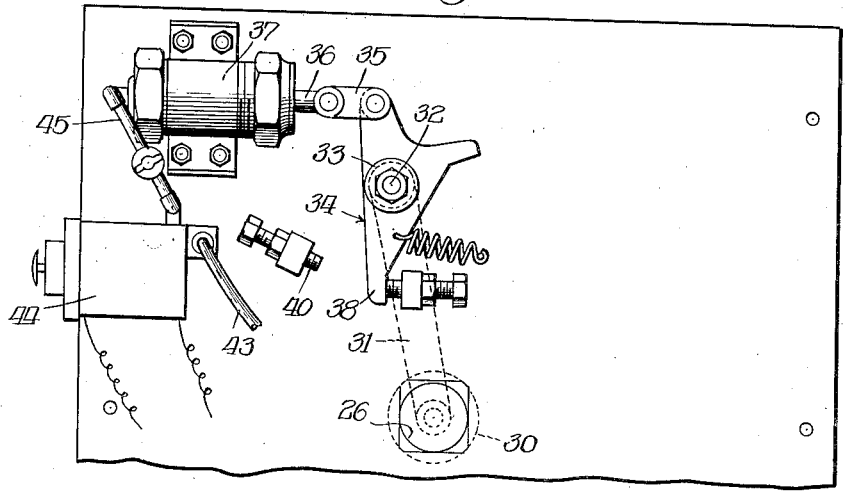
Figure 10 is a plan view showing the improved closure means for the discharge port of the feeder to the weighing bucket.

Referring to the drawings, particularly Figures 1 and 2, the structure of the invention is shown as supported within an enclosure having side walls 10 and a top wall 11 which suitably connects with a conduit 12 having a screw conveyor 13 for transporting materials such as cement longitudinally of the conduit and which feeds said material through an opening closed by the gate valve 14, to a hopper 15 joining at its upper end with said conduit 12 so that the gate valve 14 serves to close the opening between the conduit and hopper to shut off the supply of material thereto. The hopper has an arcuate bottom wall 16 and a transversely extending partition 17 providing a circular wall for the impeller 18 positioned centrally of the wall and fixed to the shaft 20. Said shaft is journalled in bearings 21 fixed to end plates 22 suitably secured to the hopper 15 and has connection to the electric motor 23 supported on bracket 24 which provides means for rotating said impeller. In addition to the impeller 18 the feeder includes a plurality of paddles or propellers 25 fixed to shaft 20 on the respective sides of the impeller and which are accordingly rotated by said shaft to agitate the material in the hopper and propel the same toward the impeller which in turn forces the material into a main discharge port 26, Figure 10, and an auxiliary discharge port 27.

The housing designated in its entirety by 28, to which is connected a pipe 29 for dust removal, supports the hopper 15 on the upper wall thereof and as the discharge ports of the feeder extend through said wall the same supports the operating means for the valves closing said ports. As more particularly shown in Figure 10, the discharge port 26 is closed by member 30 carried by lever 31 secured to the pivot stud 32 extending upwardly through the wall of the closure 28 and being journalled by boss 33. The upwardly projecting end of stud 32 has the arm 34 fixedly secured thereto and which is connected by link 35 with piston rod 36 operating within the air cylinder 37. A projection 38 on arm 34 controls its travel by means of the stops 40. The compressed air supply line 43 is provided with a valve controlled by the solenoid 44 so that compressed air admitted through pipe 45 leading to the air cylinder 37 is controlled through the energization of the solenoid, the operation of which will be more particularly described in connection with the wiring diagram of Figure 11. It will be understood, however, that admission of air under pressure to cylinder 37 will rotate member 34 and lever 31 in a direction clockwise to open the discharge port 26.

Below the bracket 24 and supported on platform 55 is a balance beam designated in its entirety by 56, having a yoke 57 rotatably supporting a weighing bucket 58 within the housing 28. On the end of the beam opposite bucket 58 is a container 60 rotatably supported in much the same manner as the bucket and which is filled with any suitable material to provide a balance for the material delivered to the weighing bucket. The main section of beam 56 comprises side members 61 and 62 having secured at a point substantially equi-distant from the bucket and container a housing 63 closed by top member 64. The side members to the rear of the container are joined by plate 65 and at the end adjacent yoke 57 they are joined by the plate 66, which has suitably secured thereto a bearing 67 rotatably supporting shaft 68 having the yoke 57 keyed to its outer end. Shaft 68 extends through the housing 63, being journalled by bearings 70 and 71 secured to the side walls of the housing. A pinion 72 is keyed to the portion of shaft 68 within the housing, Figure 5, and has meshing engagement with rack 73 having a reduced portion 74 mounted in bearing 75 provided in the base wall of the housing and a reduced portion 76 which passes through the top wall 64 closing the housing. The air cylinder 77 encloses the upwardly projecting end 76 and is suitably secured as by bolts 78 to wall 64. The end 76 carries a piston 80 which is caused to reciprocate within the cylinder when air under pressure is admitted to supply pipe 81. When the air is exhausted the piston is forced upwardly by the coil spring 82 confined between the piston and wall 64. It will be observed that this section of piston 80 will reciprocate rack 73 causing rotation of shaft 68 and the weighing bucket 58 to dump the materials from the bucket. The extent of rotation of shaft 68 upon full movement of the piston 80 is substantially 180 degrees so that the bucket rotates from an upright position, where the materials are fed to the bucket by the feeder above described to an inverted position where materials will be delivered to bag filling apparatus to be presently described.

As shown in Figures 5 and 6 the side members 61 and 62 have secured thereto the brackets 83 which receive the threaded screws 84 held in adjusted position by locking nuts. Brackets 83 also receive yoke members 85 which are vertically slidable on their respective brackets, being located in desired vertical position by the screws 84. An insert 86 is removably held in each member 85 by screws 87, the insert having a V-shaped notch as shown. The supports 88 are bifurcated at their upper end for receiving member 90 which provides a knife edge fitting within the notch in its respective insert 86 to frictionlessly balance the beam 56. For preventing lateral movement of the beam and attached supporting structure the supports 88 have secured to their outside surface the plates 91 which receive threaded screws 93, the said screws being in alignment with the fulcrum for the balance beam and having contact with plates 94 suitably secured to brackets 83. Adjustment of the threaded screws 93 will operate to center the beam with respect to the supports and the fulcrum provided thereby and will also prevent lateral movement of the beam while allowing free pivotal movement of the beam on the knife edges provided by the members 90. Projecting upwardly from platform 55 are a plurality of stops, the forward stop 95 being located for alignment with plate 66 limiting the downward movement of the beam, while the rear stops 96 are adapted to contact side members 61 and 62 of the beam to limit downward movement of the rear end and conversely, upward movement of the forward end.

The material is delivered by the weighing bucket 58 to an impeller 98, Figure 7, keyed to shaft 99 which projects through the bottom plate 100 secured by bolts 101 to the base flange of the housing 28 and projecting upwardly within the base portion formed by the tapering walls 102 of the housing. A feeder plate 103 having a number of bent blades is fixedly secured to the upwardly projecting end of shaft 99 and operates to break the fall of the material discharged from the bucket 58, part of the material passing between the blades of the plate and the remaining material passing between the plate and the walls. The pair of upstanding knives 104, secured to opposite blades of the plate 103, cut into the material along the walls and keep the same agitated so that the material is eventually supplied to the impeller 98. By this structure the material is delivered to the impeller in a uniform manner and therefore the discharge of the material through port 120 is accordingly more uniform. The base plate 100 is also protected against the abrasive action of the material by liner 105. Also suitably secured to the base of the housing 28 by bolts 101 is a casing designated in its entirety by 106, said casing being suitably supported upon the top wall of the enclosure 107 which houses bag handling mechanism to be presently described. Casing 106 provides bearings 108 for journalling a shaft 109 which connects in any suitable manner with an electric motor 110 providing the driving means for said shaft. That section of shaft 109 within the casing has suitably keyed thereto a spiral pinion 111 which is provided with a thrust bearing 112 located between the pinion and an adjustable collar 113. Pinion 111 meshes with spiral gear 114 keyed to the vertical shaft 99, the upper portion of the shaft being journalled by bearing 115 secured to the bottom surface of plate 100 and bearing 116 secured to the base of casing 106. A thrust bearing 117 is also provided for this shaft, being located below gear 114 and between said gear and an adjustable collar 118. The structure just described journals shaft 99 for rotation on a vertical axis so that the material delivered to the impeller 98 will be discharged through the horizontal port 120 which connects tangentially with the base of the housing 28.

Journalled in bearings 121 provided by the enclosure 107 and also having reciprocation within said bearings is a shaft 122 having fixedly secured to one end the bag holder 123. The central portion of the shaft is provided with teeth 124 and the right hand end projects from the enclosure 107, being housed by the tube 125. The air cylinder 126 actuates a rack bar 127 having meshing engagement with teeth 124 on the shaft 122 and rotating said shaft when air under pressure is admitted to said cylinder. A second air cylinder 128 actuates a link 130 which operates the pivoted lever 131 connecting at its upper end with shaft 122. Admission of air to cylinder 128 will therefore cause rotation of lever 131 and reciprocation of the shaft to locate the bag holder 123 outwardly from the position shown in Figure 1. This outward motion of the bag holder will free the bag of the discharge port 120, whereupon the same can be rotated, which is accomplished by operation of air cylinder 126. Simultaneously with this rotation the shaft is reciprocated in an opposite direction to move the bag holder inwardly, the result of the combined movements being to discharge the bag 129 from the holder 123 onto a conveyor belt 132 supported by rollers 133, which transports the bag to the desired location.

The bag holder 123 has a bottom member 134 yieldingly supported from the side members by the resilient coil springs 135 so that the bottom is movable with respect to the sides and yieldingly supports the bag 129. Said bottom member carries an electric motor 136 having a rotor shaft on which is fixed an unbalanced weight 137 so that rotation of the rotor shaft at high speed will result in vibrating the base member 134. Constant vibration of the bag 129 by means of the above vibrator, or by other suitable vibrating means, during the time the cement is being delivered thereto settles the cement within the bag and makes it possible to fill the bag to the top with the proper weight of material.

Figure 11:
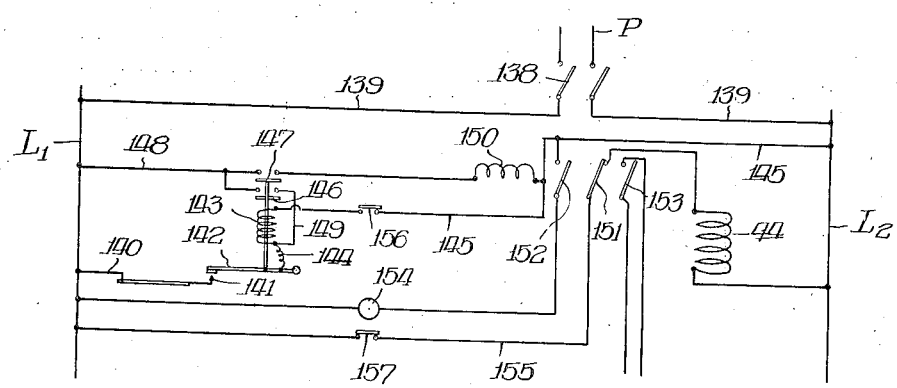
Figure 11 is a wiring diagram showing the electrical connections for the weighing mechanism.

The operation of the present weighing device will be better understood by reference to Figure 11 which shows the wiring diagram therefor. Electric power is supplied by the lines designated P and which are suitably connected through a start and stop switch 138 to conductors 139 leading to the lines $L_1$ and $L_2$, respectively. A conductor 140 connects the line $L_1$ to a contact 141 carried by the balance beam 56, as clearly shown in Figure 4. A lever 142 is suitably supported in position above and properly spaced from contact 141 when said end of the beam is down, the lever providing an armature for the electro-magnet 143 and being adapted to engage contact 141 upon upward movement of said end of the beam. A conductor 144 connects the armature lever with one end of the electro-magnet, said other end of the electro-magnet, namely, 145, having connection with line $L_2$, as shown in the wiring diagram. When the materials fed to bucket 58 by the feeder equal the predetermined weight for which the balance beam has been set the end carrying contact 141 will move upward into engagement with the armature lever 142 which will close the circuit between lines $L_1$ and $L_2$, energizing the electro-magnet 143, which immediately attracts the armature lever, lifting the same out of engagement with contact 141. The lever therefore does not interfere with the accuracy of the weighing operation. As will be clear from an inspection of the wiring diagram, energization of the electro-magnet 143 will cause the contacts 146 and 147 to close, the former connecting the electro-magnet to lines $L_1$ and $L_2$ through the conductors 148, 149 and the conductor 145. Thus electro-magnet 143 remains energized even though the balance beam should move out of engagement with the armature lever. The contact 147 closes the circuit to the relay 150. The energization of said relay actuates a plurality of contacts, namely, a normally closed switch 151 and a pair of normally opened contacts 152 and 153. Opening contact 151 will break the circuit to solenoid 44, which as has been previously described, controls the admission of compressed air to the air cylinder 31 and deenergization of this solenoid will close the discharge port of the feeder. Closing of contact 152 will close the circuit to the electric bulb 154, causing the same to light, which bulb is located to the outside of the housing 28 to indicate to the operator the scale has completed the weighing of a load. The normally open contact 153 is likewise closed by energization of the relay and the circuit including said contact is utilized for purposes which form no part of the present invention.

With the parts in the position above described the bucket contains a quantity of material of predetermined weight which holds the same in readiness for discharge to the bag filling means. When the operator has placed an empty bag within holder 123 and suitably located the discharge port 120 within the bag he clamps the bag to the discharge port by manually actuating the bag clamp 119. The clamp connects with an air cylinder 119a and can be actuated automatically by a valve admitting air to the cylinder. The operator then operates the air cylinder 77 in a like manner, causing rotation of the shaft 68 and the weighing bucket to discharge the materials to the impeller 98 which operates as described to deliver the material to fill the empty bag. Rotation of the weighing bucket for the dumping operation actuates contacts 156 and 157, the former breaking the circuit to electromagnet 143, deenergizing said electro-magnet and allowing the armature lever to descend to its initial position where it will be supported by stop 158 and actuation of the latter contact opening the circuit, including conductor 155 and the solenoid 44, so that the discharge ports of the feeder can not be opened when the bucket is not in upright position. When the bucket is returned to upright position the contacts are closed and therefore both circuits are returned to normal. The closing of contact 156 does not energize the electro-magnet 143 since the armature lever has dropped and contacts 146 are open. However, the closing of contact 157 does energize the feeder solenoid 44, causing the ports to open and feeding of the material to bucket 58 to begin, since the relay 150 was deenergized by the return of the armature lever and contact 151 was accordingly closed. A weighing operation takes place while a bag is being filled by impeller 98 so that the bucket 58 is ready to be dumped by the time the operator has removed the filled bag and placed in position an empty bag.

The invention is not to be limited to or by details of construction of the particular embodiment thereof illustrated by the drawings, as various other forms of the device will of course be apparent to those skilled in the art without departing from the spirit of the invention or the scope of the claim.

I claim:

In weighing apparatus for finely divided materials, the combination with feeding means having a discharge port through which material is delivered, a closure for said port, electro-magnetic means for controlling the closing and opening movements of said closure, a balance beam located below the feeding means and having a rotatable shaft supporting a bucket below the discharge port, contacts associated with said balance beam and included in the circuit to the electromagnetic means whereby said means is energized and deenergized in response to the movements of the balance beam, and a pressure cylinder carried by the balance beam for rotating said bucket from an upright to a dump position.

ADOLPH G. CARLSON.